Feb. 21, 1967  A. E. ZIMMERMAN  3,305,148
INSTRUMENT HARNESS
Filed July 13, 1965
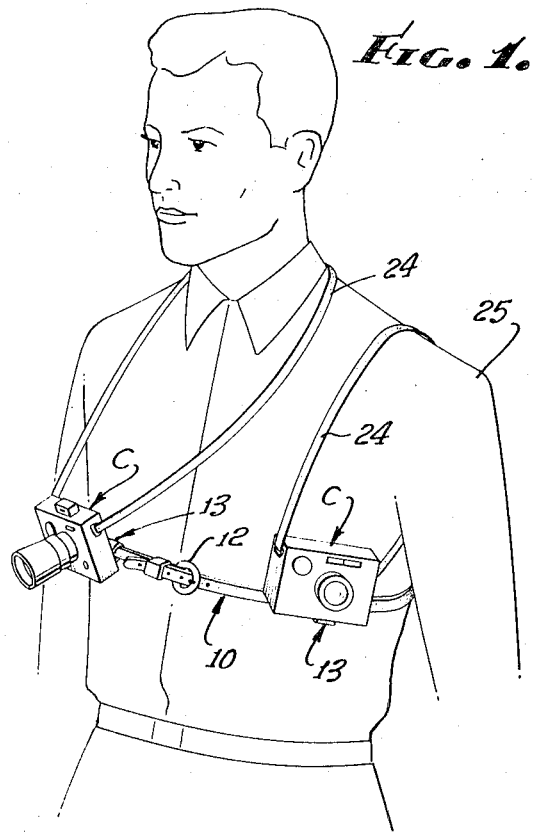
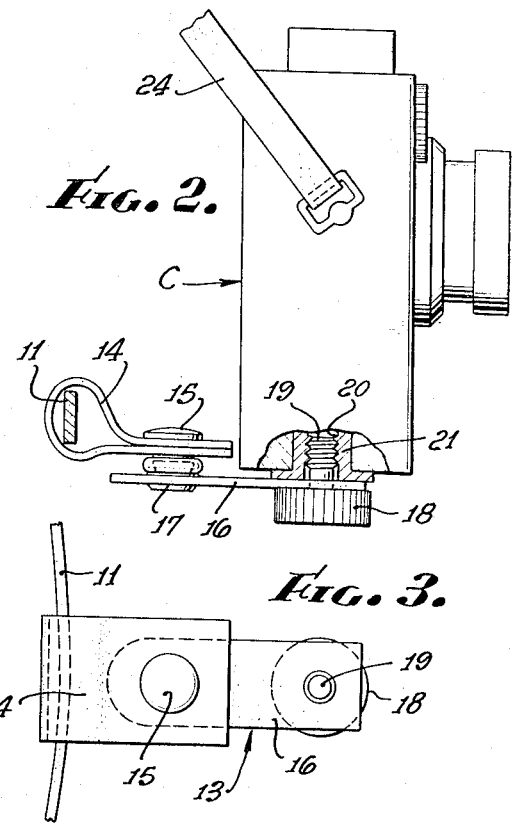
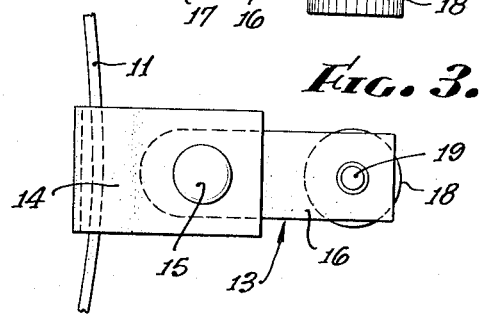
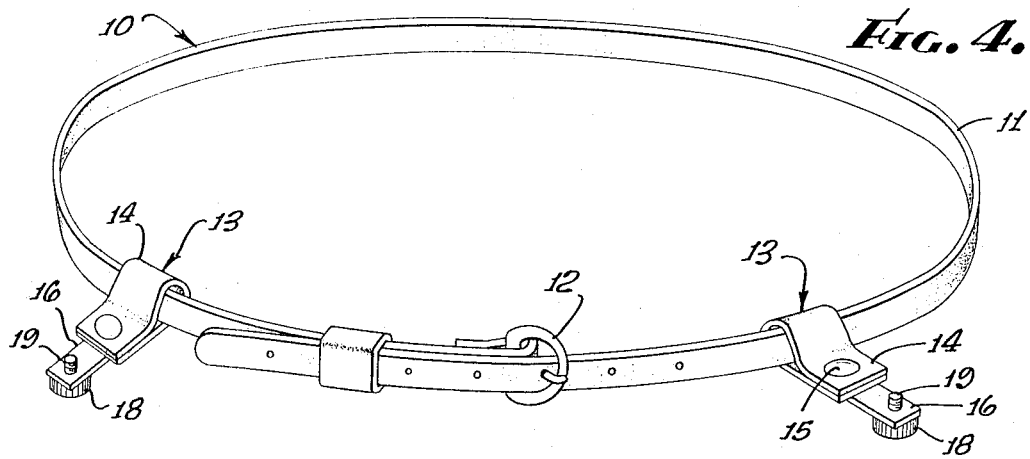
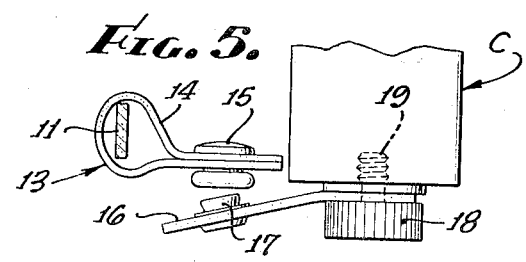
INVENTOR.
ARTHUR E. ZIMMERMAN
Warren T. Jessup
Atty.

United States Patent Office 3,305,148
Patented Feb. 21, 1967

3,305,148
INSTRUMENT HARNESS
Arthur E. Zimmerman, 2232 Ave. M-4 W.
Lancaster, Calif. 93534
Filed July 13, 1965, Ser. No. 471,646
2 Claims. (Cl. 224—5)

This invention relates in general to devices for carrying instruments, such as cameras, binoculars, and the like, upon the human body, and more particularly to a temporarily securable retainer for cameras employed only while the camera is not in use.

Although this invention is directed more to the needs of the professional photographer and the serious amateur, it has application to all photographers.

Traditionally, the professional photographer has used a large film size camera, usually holding sheet film in separate holders. However, with the improvement in film, it is now quite common for a photographer to use small roll film cameras.

Furthermore, it is becoming common for a professional or a serious amateur to carry several small cameras. For example, the photographer may carry one camera with color and another with black and white film. One camera may carry a telephoto lens, and another a standard, or wide-angle lens. Thus, the photographer may equip himself for several eventualities within a particular assignment. Then, he is prepared to take advantage of the situation existing at the moment by the selection of a camera properly loaded and equipped.

The use of a plurality of small cameras has brought about a complication which has harassed the photographer, and prior to the present invention has not been solved. That problem is the placement of the cameras for quick and ready accessibility. In a fast-action situation, the photographer does not usually have time, nor desire, to place his cameras in a carrying bag which he must leave at a central location. Very often he moves about, and such bag is not where he desires the camera to be on a moment's notice. Furthermore, such extra cameras are subject to theft and damage when placed in a carrying bag and left at a central location.

However, one need not be associated long with a professional cameraman using a plurality of cameras, before the serious limitation and distracting nuisance of swinging cameras becomes evident. Generally, the cameras are equipped with leather loop straps to encircle the shoulder or neck of the user in order that the camera may be protected against accidental dropping, and in order that the camera may be carried hands-free while another camera or a notebook is in use.

During an assignment, a photographer may be required to quickly ascend upon a convenient object to gain a good vantage point, and to remove himself from such vantage point quite quickly and without convenient steps. Under such conditions, the cameras held by neckstraps will swing and often strike one another. Further, they may swing out from the body of the user and strike other objects, including people. Thus, cameras are damaged and tempers flare.

Accordingly, it is the object of this invention to provide a means for holding a camera tightly to the body of the wearer during periods of non-use.

It has been found that prior art holding devices which form body harnesses, some of which use flexible straps, present a resistance to quick use of the camera, and hinder the free use thereof. It is desired that the camera be unrestrained for the best professional work. The neck strap which is generally supplied with such cameras is not a restraint in use, but rather falls free around the body in a limp and unhampering manner.

It is a further object of this invention, therefore, to provide for removable attachment of the restraining device from the camera in order that the camera may be used freely and then re-attached to the restraining device.

Although pockets and belt devices for holding a camera have been suggested for restraining a camera, the time-consuming requirements of placing a camera into a sheath are unduly restricting to the professional and serious amateur in many instances. This type of photographer wants the camera readily available and re-attachable to the restraining device without undue thought or activity.

Accordingly, it is a further object of this invention to provide a snap-fastening attachment of camera to restraining device.

In accordance with these and other objects which will become apparent hereinafter, a preferred form of the present invention is disclosed in the accompanying drawing wherein:

FIGURE 1 is an illustration of two cameras held upon the body of a photographer, by a device embodying the principles of this invention;

FIGURE 2 is a side view of a camera with a quickly-separable fastening means interconnected between camera and a body-enveloping strap, made according to the principles of this invention;

FIGURE 3 is a top view of the apparatus shown in FIGURE 2, without camera, in order to provide an unobstructed illustration;

FIGURE 4 is a perspective view of the body-encompassing portion of the combination illustrated in FIGURE 1; and FIGURE 5 is a view of the apparatus shown in FIGURE 2 with the camera partially in section and the fastening means in a separated condition.

Referring now to the drawing for a more specific illustration of a preferred embodiment of the invention, a harness, indicated by the general reference character 10, is shown around the chest area of a model wearing two cameras, each of which is indicated by reference character "C."

The harness is built upon a basic structure which is generally a belt 11, adaptable to fit relatively snug around the chest of the wearer by means of adjustment buckle 12.

It is usual camera construction to have a socket to receive a threaded stud of a hand screw mounted upon a tripod. Most cameras employed by professional photographers and the serious amateur will have such a socket. If not, adaptation may be made to serve the function of such socket.

In the illustration, the camera C in FIGURE 2 is shown as equipped with a socket receptacle 21, having a threaded internal wall 20.

An instrument fastener attachment, in the form of a flexible strap 16, is secured to the camera C by clamping it with a conventional hand screw. In the illustration, such screw is composed of a hand knob 18 and a bolt shank 19. The shank 19 extends through an opening in the flexible strap near one end thereof and into the receptacle 21. Thus, the end of the flexible strap is clamped between the surface of the camera and the hand knob 18, as well as being held by the interfit of the two parts.

This type of fit is not permanent, being replaceable by a tripod for some camera uses. Accordingly, the attachment is said to be semi-permanent. The screw is, therefore, a means for removably securing the fastening attachment strap 16 to the camera C as a semi-permanent appendage of the camera instrument.

In order to make the attachment of the camera to the belt shiftable for convenience and comfort, a tab in the form of a loop 14 is provided to shift along the belt 11. At the end of the tab, is secured the female half of a snap fastener, indicated by the reference character 15. This tab, by reason of the loop interfit around the belt, is adapted for shiftable positioning of the tab with respect to the chest of the human being wearing and using the apparatus.

The snap fastener composed of the parts 15 and 17 are quickly removable by grasping the extra lip of the flexible strap 16, and need not have any time-consuming effort or thought for such separation. Furthermore, these parts are readily rejoined. Thus, the parts 15 and 17 serve the function of the general requirement of the fastening means for joining the tab and the flexible snap in a separable holding grip capable of being separated by a force greater than the holding grip, and capable of being re-established by pressing the fastening means together. This is in contra distinction to the semi-permanent fastening of the strap 16 to the camera, and the semi-permanent fastening of the belt 11 to the wearer.

By provision of this invention, the camera seen may be provided with a neck band 24 to wear around the neck or around a shoulder 25 of the model shown in FIGURE 1. Note that the camera is secure and safe in such shoulder position against dropping over the arm, because the camera is held snugly to the body by the easily detachable, but very secure, fastening of the snap fastener.

Accordingly, this invention provides a structure which enables a camera to be held close to the body regardless of the stooping, bending, or turning action of the wearer, but which may be disengaged in an instant for completely free use, or even the putting off of a particular instrument.

While the instant invention has been shown and described herein in what is conceived to be the most practical and preferred embodiment, it is recognized that departures may be made therefrom within the scope of the invention which is, therefore, not to be limited to the details disclosed herein, but is to be afforded the full scope of the invention as hereinafter claimed.

What is claimed is:
1. A harness assembly for carrying cameras, and the like, on the human body, including:
   a belt to be worn around the torso of the wearer;
   an adjustable buckle means attached to said belt for securing said belt around the said torso;
   at least one tab looped around said belt to be shiftable along said belt;
   a flexible strap secured to a camera to be supported by the harness assembly, said strap having a free end portion;
   a snap-fastener intercoupling said tab and said free end portion of said flexible strap for releasably mounting the camera on the belt; and
   a neck band secured to the camera and extending around the upper torso of the wearer so as to suspend the camera therefrom.
2. The assembly defined in claim 1 in which the camera includes a threaded tripod socket, and which includes a hand screw threaded into said socket for securing said flexible strap to the camera.

References Cited by the Examiner
UNITED STATES PATENTS

| | | | |
|---|---|---|---|
| 1,145,176 | 11/1913 | Willson | 224—5 |
| 1,989,527 | 1/1935 | Powers | 224—5 X |
| 2,351,675 | 10/1942 | Gengler | 224—5 X |
| 3,152,738 | 10/1964 | Worsfold | 224—5 |
| 3,209,968 | 10/1965 | Flanagan | 224—5 |

FOREIGN PATENTS 245,403    4/1912    Germany.

HUGO O. SCHULZ, *Primary Examiner.*